United States Patent
Roos

[19]

[11] Patent Number: 6,008,754
[45] Date of Patent: Dec. 28, 1999

[54] ON-GROUND RADIO ALTIMETER CALIBRATION SYSTEM

[75] Inventor: Mark G. Roos, Shawnee, Kans.

[73] Assignee: AlliedSignal Inc., Morristown, N.J.

[21] Appl. No.: 08/910,190

[22] Filed: Aug. 12, 1997

Related U.S. Application Data

[60] Provisional application No. 60/024,073, Aug. 15, 1996.

[51] Int. Cl.$^6$ ..................................................... G01S 7/40
[52] U.S. Cl. ............................................ 342/174; 342/120
[58] Field of Search ...................................... 342/174, 120, 342/121, 122, 123

[56] References Cited

U.S. PATENT DOCUMENTS

| | | | |
|---|---|---|---|
| 3,364,437 | 1/1968 | Loposer | 331/1 |
| 3,535,651 | 10/1970 | Peterson | 331/4 |
| 3,579,281 | 5/1971 | Kam | 332/30 V |
| 3,860,925 | 1/1975 | Darboven, Jr. | 342/109 |
| 4,121,213 | 10/1978 | Bush et al. | 342/172 |
| 4,272,729 | 6/1981 | Riley | 331/1 A |
| 4,367,473 | 1/1983 | Marin et al. | 342/87 |
| 4,468,638 | 8/1984 | Kyriakos | 331/178 |
| 4,488,123 | 12/1984 | Kurihara | 331/2 |
| 4,503,401 | 3/1985 | Kyriakos et al. | 331/4 |
| 4,593,287 | 6/1986 | Nitardy | 343/17.5 |
| 4,683,473 | 7/1987 | Huagland | 342/172 |
| 4,754,277 | 6/1988 | Voyce | 342/83 |
| 4,806,935 | 2/1989 | Fosket et al. | 342/120 |
| 4,825,214 | 4/1989 | Dejaegher | 342/128 |
| 4,904,956 | 2/1990 | Dennis | 331/4 |
| 4,931,749 | 6/1990 | Walters | 331/4 |
| 4,998,217 | 3/1991 | Holcomb | 364/573 |
| 5,160,933 | 11/1992 | Hager | 342/174 |
| 5,175,509 | 12/1992 | Taylor | 331/4 |
| 5,210,539 | 5/1993 | Voyce | 342/83 |
| 5,252,981 | 10/1993 | Grein | 342/200 |
| 5,300,934 | 4/1994 | Asbell et al. | 342/172 |
| 5,369,376 | 11/1994 | Leblebiciogiu | 331/8 |
| 5,440,275 | 8/1995 | Erb | 331/4 |
| 5,719,582 | 2/1998 | Gray | 342/120 |

*Primary Examiner*—John B. Sotomayor

[57] ABSTRACT

To ensure that a radio altimeter indicates zero altitude when the aircraft is on the ground, an on-ground calibration system utilizes a calibration switch to initiate a calibration radio altimeter signal from the radio altimeter's transmitter section which is reflected off of the ground and received by the altimeter's receiver section. The time delay between transmission and reception of the signal is measured and a value representing the delay is stored in the altimeter's microprocessor. This value corresponds to zero altitude and can be used as the relative zero point for calculating altitudes of the aircraft when it is in flight.

19 Claims, 1 Drawing Sheet

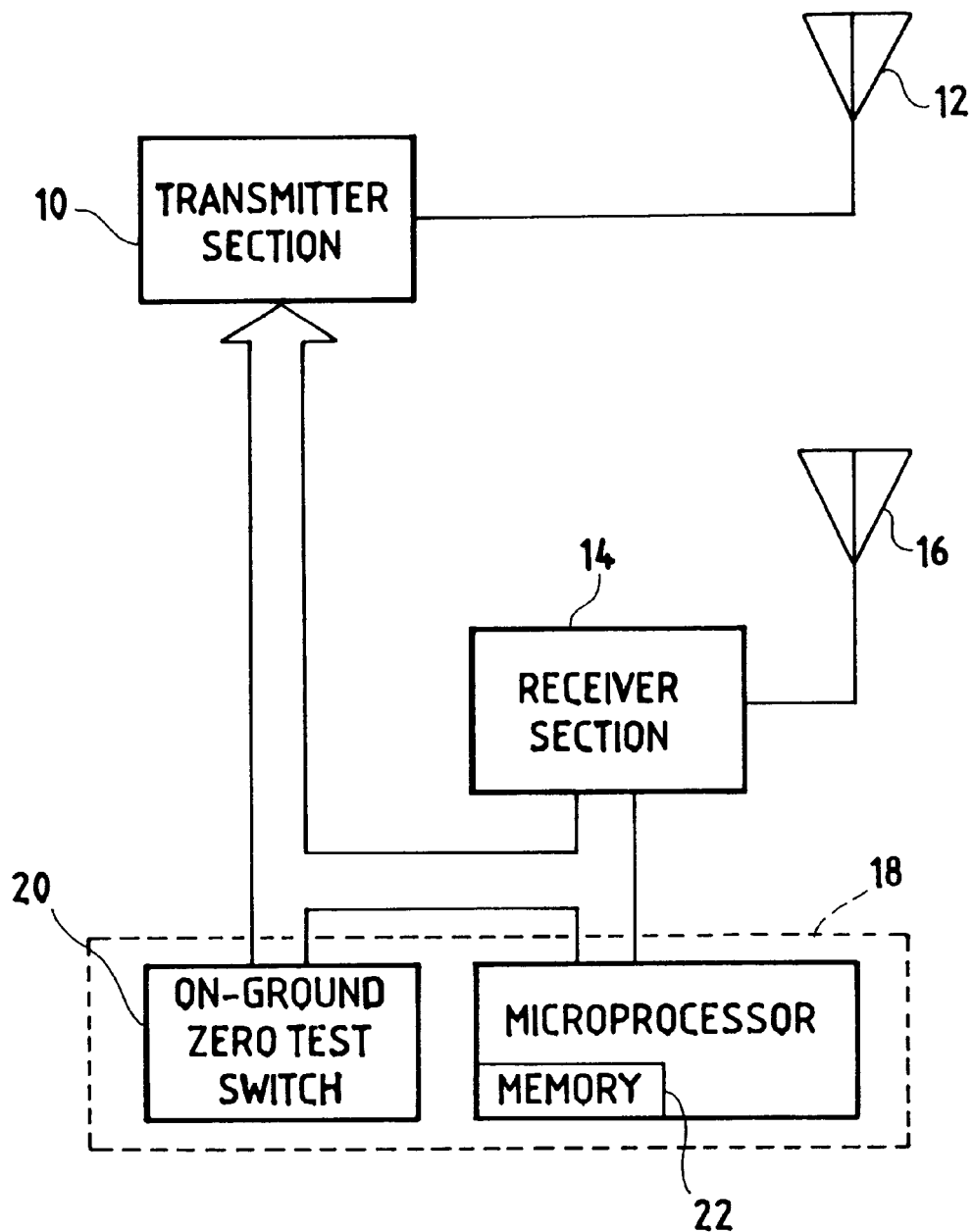

ON-GROUND RADIO ALTIMETER CALIBRATION SYSTEM

This application claims priority from U.S. Provisional application Ser. No. 60/024,073 filed Aug. 15, 1996.

FIELD OF INVENTION

The invention relates aircraft radio altimeters, also known as radar altimeters, and more particularly to calibration of radio altimeters.

BACKGROUND OF THE INVENTION

Radio altimeters determine altitude by transmitting a radio signal and timing the delay of the return echo. The time delay of the return echo is influenced by the height of the antenna above ground and by the amount of delay caused by the antenna cables.

Radio altimeters are installed at different distances from the ground depending on the aircraft and the particular installation parameters. Therefore, radio altimeters require calibration during installation. Calibration ensures that the radio altimeter indicates zero feet when the aircraft is on the ground. Current radio altimeter calibration technology requires the radio altimeter to be calibrated by adjusting the length of the cable connecting the radio altimeter to its antenna during installation. This calibration approach typically requires an excess length of antenna cable which is commonly referred to as an Aircraft Installation Delay (AID) cable. The calibration cable length must be calculated, then the cable must be trimmed to a precise length. As a result this technique often results in more antenna cable length than would otherwise be required, which results in excess weight and cost.

SUMMARY OF THE INVENTION

The present invention responds to the need for a less costly and lighter radio altimeter calibration means by providing a means for the installer to switch a radio altimeter into a calibration mode. When the radio altimeter enters the calibration mode, the invention provides a radio calibration signal which is transmitted through a transmit antenna. The transmitted signal is reflected off the terrain and received through a receive antenna. The invention measures the time delay of the return echo and stores the result in a non-volatile memory. The value stored in the non-volatile memory corresponds to zero feet and is used as the relative zero point for calculating all other altitudes.

BRIEF DESCRIPTION OF THE DRAWING

FIG. 1 is system block diagram according to the preferred embodiment of the present invention.

DETAILED DESCRIPTION OF THE PREFERRED EMBODIMENT(S)

The invention responds to the need for a less costly and lighter radio altimeter calibration method which eliminates the requirement for an AID cable by providing a mechanism for the installer to invoke a calibration mode in a radio altimeter. In one preferred embodiment the calibration mode is invoked by depressing a switch for a short period of time by the radio altimeter installer.

According to the preferred embodiment of the invention, when the radio altimeter enters the calibration mode, the invention provides a calibration radio signal. The radio altimeter transmits the calibration signal out through the radio altimeter's transmit antenna. The transmitted signal is reflected off the terrain and received through the radio altimeter's receive antenna. The system then measures the total time delay of the return echo including the cable delay and the antenna height delay. After the time delay is measured, its value is stored in a non-volatile memory. The value stored in the non-volatile memory corresponds to zero feet. According to the invention, the radio altimeter can then use the stored value as the relative zero point for calculating all other altitudes.

FIG. 1 is a block diagram of a conventional radio altimeter incorporating one embodiment of the invention. Included in the radio altimeter is a transmitter section 10 for generating a radio signal and transmitting it towards the ground through a transmission antenna 12. The transmitter section 10 can typically include a voltage controlled oscillator (VCO), a driver circuit for causing the VCO to generate a frequency modulated continuous wave radio signal and a power amplifier for amplifying the radio signal before it is transmitted through the antenna 12.

In a preferred embodiment, the continuous wave is frequency modulated such that the frequency increases and decreases linearly. Thus, the transmitted frequency modulated radio signal is linear in frequency as it varies in time. The slope of this linear relationship is the frequency deviation rate and is often expressed in Hz per foot of altitude. However, as is evident from above, the frequency deviation rate can also be used to measure time.

Another portion of the radio altimeter is a receiver section 14 for receiving, through a receive antenna 16, the radio signal which has been reflected from the ground. The receiver section 14 would in this case include a frequency counter for determining the frequency of the reflected radio signal.

Also included in the radio altimeter is a microprocessor section 18 having a microprocessor for calculating, from the difference in the frequencies between the transmitted and reflected signal, the delay of the reflected radio signal from the time that it is transmitted from the transmitter section 10. The time delay provides a measure of the aircraft's altitude above the ground.

In the preferred embodiment of the invention, an on-ground zero test switch 20 is connected to the microprocessor 18. Pressing the switch 18 causes the microprocessor 18 to generate a calibration radio signal. The time delay in receipt of the calibration radio signal is then calculated by the microprocessor 18 and stored in a non-volatile memory 22. Preferably, the chances of accidental depression of the switch 20 can be reduced by recessing the switch 20 and providing the microprocessor 18 with instructions that insure that the switch 20 must be depressed for a minimum period, on the order of a few seconds, before the calibration radio signal is generated. This calculated time delay stored in memory 22 can then be used by the microprocessor 18 as the relative zero feet altitude of the aircraft when computing the altitude of the aircraft in flight.

I claim:

1. An aircraft on ground radio altimeter calibration system comprising:

a radio altimeter having a transmitter section for transmitting a radio signal towards the ground, a receiver section for receiving the portion said radio signal reflected from the ground and a processor section, operatively connected to said transmitter section and said receiver section, for calculating the delay in time of said radio signal from transmission from said transmitting section to receipt by said receiver section; and calibration means for transmitting a calibration radio signal from said transmitting section, receiving from said receiving section the portion of said calibration radio signal reflected from the ground and measuring the time delay between the transmission and receipt of said calibration radio signal and storing in said processor section the value of said time delay as a relative value of zero altitude of the aircraft.

2. The system of claim 1 wherein said calibration means includes switch means for initiating said calibration radio signal from said transmitter section.

3. The system of claim 2 wherein said switch means includes a switch that must be depressed for a predetermined minimum time before said calibration radio signal is initiated by said transmitter section.

4. The system of claim 3 wherein said minimum time is at least two seconds.

5. The system of claim 1 wherein said processor section includes a nonvolatile memory for storing said value of said time delay.

6. A method for on-ground calibration testing of an aircraft radio altimeter comprising the steps of:

selecting an on-ground calibration mode in the radio altimeter;

transmitting a calibration radio signal from a transmitter section in the radio altimeter;

receiving a portion of said calibration radio signal reflected from the ground in a receiver section of the radio altimeter;

measuring the time delay from the transmission to the reception of said calibration signal; and storing a value representing said time delay in said radio altimeter as a relative value of zero altitude of the aircraft.

7. The method of claim 6 wherein said step of storing said value includes the step of storing said value in a nonvolatile memory in a processor section of said radio altimeter.

8. An aircraft radio altimeter calibration system comprising:

a transmitter section for transmitting a calibration radio signal;

a receiver section for receiving a reflected portion of a transmitted calibration radio signal; and a calibration processor operably connected with the transmitter section and the receiver section and configured to calculate a delay between a transmitted calibration radio signal and a received reflected portion thereof, and to store a value associated with the calculated delay for use as a relative value of zero altitude for an aircraft.

9. The aircraft radio altimeter calibration system of claim 8, wherein the calibration processor includes memory configured to receive and store the value associated with the calculated delay.

10. The aircraft radio altimeter calibration system of claim 8, wherein the calibration processor includes non-volatile memory configured to receive and store the value associated with the calculated delay.

11. An aircraft comprising:

an aircraft radio altimeter calibration system having,
a transmitter section for transmitting a calibration radio signal;
a receiver section for receiving a reflected portion of a transmitted calibration radio signal; and
a calibration processor operably connected with the transmitter section and the receiver section and configured to calculate a delay between a transmitted calibration radio signal and a received reflected portion thereof, and to store a value associated with the calculated delay for use as a relative value of zero altitude for an aircraft.

12. The aircraft of claim 11, wherein the calibration processor is configured to use the stored value associated with the calculated delay as the relative value of zero altitude when computing an altitude of the aircraft in flight.

13. A radio altimeter on-ground calibration method comprising:

receiving a transmitted calibration radio signal reflected from the ground and carrying with it a time delay; and using the time delay, storing a value associated with the time delay as a relative value of zero altitude for an aircraft.

14. The radio altimeter on-ground calibration method of claim 13 further comprising prior to the receiving of the transmitted calibration radio signal, transmitting a calibration radio signal towards the ground.

15. The radio altimeter on-ground calibration method of claim 13 further comprising after receiving the transmitted calibration radio signal, measuring the time delay between transmission of the signal to reception of the signal.

16. The radio altimeter on-ground calibration method of claim 13 further comprising using the stored value associated with the time delay to compute the altitude of an aircraft in flight.

17. A radio altimeter on-ground calibration method comprising providing an on-ground calibration system configured to:

receive a transmitted calibration radio signal reflected from the ground and carrying with it a time delay; and use the time delay to store a value associated with the time delay as a relative value of zero altitude for an aircraft.

18. The radio altimeter on-ground calibration method of claim 17, wherein the on-ground calibration system is further configured to transmit a calibration radio signal.

19. The radio altimeter on-ground calibration method of claim 17, wherein the on-ground calibration system is further configured to use the stored value associated with the time delay to compute the altitude of an aircraft in flight.

\* \* \* \* \*